United States Patent [19]

Perry

[11] Patent Number: 5,210,175

[45] Date of Patent: May 11, 1993

[54] PREPARATION OF AROMATIC POLYAMIDES FROM CO, AROMATIC, DIAMINE AND DI(TRIFLUOROMETHANE SULFONATE)

[75] Inventor: Robert J. Perry, Pittsford, N.Y.

[73] Assignee: Eastman Kodak Company, Rochester, N.Y.

[21] Appl. No.: 841,929

[22] Filed: Feb. 25, 1992

[51] Int. Cl.$^5$ ............................................. C08G 69/00
[52] U.S. Cl. ..................... 528/391; 528/15; 528/25; 528/33; 528/220; 528/225; 528/348; 528/422
[58] Field of Search ................. 528/391, 422, 348, 15, 528/25, 33, 220, 225

[56] References Cited

U.S. PATENT DOCUMENTS

| | | |
|---|---|---|
| 4,165,332 | 8/1979 | Beard et al. . |
| 4,621,149 | 11/1986 | Fukuoka et al. . |
| 4,868,271 | 9/1989 | Dahl et al. . |
| 4,894,431 | 1/1990 | Armbruster et al. . |
| 4,925,916 | 5/1990 | Harris et al. . |
| 4,933,419 | 6/1990 | Perry et al. . |
| 4,933,466 | 6/1990 | Perry et al. . |
| 4,933,467 | 6/1990 | Perry et al. . |
| 4,933,468 | 6/1990 | Perry et al. . |
| 5,104,971 | 4/1992 | Perry et al. ................ 528/391 |

FOREIGN PATENT DOCUMENTS

| | | |
|---|---|---|
| 3431591 | 3/1986 | Fed. Rep. of Germany . |
| 89/123823 | 5/1989 | Japan . |
| 1-299256 | 12/1989 | Japan . |

OTHER PUBLICATIONS

Yoneyama, M. et al., "Novel Synthesis of Aromatic Polyamides by Pd-Catalyzed Polycondensation of Aromatic Dibromides, Aromatic Diamines, and Carbon Monoxide", (1988), *Macromolecules*, vol. 21, pp. 1908-1911.

Cacchi, S. et al., "Pd-Catalyzed Carbonylation of Aryl Triflates, Synthesis of Arenecarboxylic Acid Derivatives from Phenols", (1986), *Tetrahedron Letters*, vol. 27, No. 33, pp. 3931-3934.

Cacchi, S. et al., "Pd-Catalyzed Carbonylation of Enol Triflates, A Novel Method for One-Carbon Homologation of Ketones to Alpha,Beta-Unsaturated Carboxylic Acid Derivatives", (1985), *Tetrahedron Letters*, vol. 26, No. 8, pp. 1109-1112.

Aoki, S. et al., "Synthesis of 1,4-Dicarbonyl Compounds by Palladium-Catalyzed Carbonylative Arylation of Siloxycyclopropanes", SYNLETT, Dec. 1990, pp. 741-742.

Chen, Q-Y, "Pd-Catalyzed Reaction of Phenyl Fluoroalkanesulfonates with Alkynes and Alkenes", (1986), *Tetrahedron Letters*, vol. 27, No. 10, pp. 1171-1174.

Dolle, R. E. et al., "Palladium Catalyzed Alkoxycarbonylation of Phenols to Benzoate Esters", *J. Chem. Soc., Chem. Commun.*, (1987), pp. 904-905.

Eschavarren, A. M. et al., "Palladium-Catalyzed Carbonylative Coupling of Aryl Triflates with Organostannanes", *J. Am. Chem. Soc.*, (1988), vol. 110, pp. 1557-1565.

Mutin, R. et al., "Bi-metallic Activation in Homogeneous Catalysis: Pd-Catalysed Carbonylation of Tricarbonyl (chloroarene)chromium Complexes to the Corresponding Aldehydes, Esters, Amides, and Alpha-Oxo Amides, (1988)", *J. Chem. Soc., Chem. Commun.*, pp. 896-897.

Scott, W. J., "Pd-Catalysed Coupling Reactions of Chloroaryl CR(CO)$_3$ Complexes", (1987), *J. Chem. Soc. Chem. Commun.*, pp. 1755-1756.

*Primary Examiner*—Harold D. Anderson
*Attorney, Agent, or Firm*—Robert Luke Walker

[57] ABSTRACT

A method for preparing polyamide comprising reacting carbon monoxide and the reactant pair

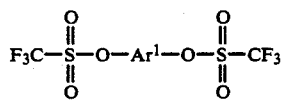

and H$_2$N—Ar$^2$—NH$_2$, wherein —Ar$^1$— and —Ar$^2$— are each independently selected from the group consisting of aromatic and heteroaromatic moieties having a total of ring carbons and heteroatoms of from 6 to about 30, in the presence of solvent and a catalyst. The catalyst is a compound of a metal selected from the group consisting of platinum, palladium and nickel.

20 Claims, No Drawings

PREPARATION OF AROMATIC POLYAMIDES FROM CO, AROMATIC, DIAMINE AND DI(TRIFLUOROMETHANE SULFONATE)

CROSS-REFERENCE TO RELATED APPLICATIONS

This invention relates to the inventions disclosed in the following U.S. patent applications, which have been cofiled with this application and are commonly assigned and are incorporated herein by reference: METHOD FOR THE PREPARATION OF AROMATIC POLYESTERS, by Robert J. Perry, U.S. Ser. No. 07/841,936, and METHOD FOR THE PREPARATION OF AROMATIC POLY(IMIDEAMIDE)S, by Robert J. Perry, S. Richard Turner, and Richard W. Blevins, U.S. Ser. No. 07/841,926.

BACKGROUND OF THE INVENTION

The present invention pertains to a process for the preparation of aromatic polymers and more particularly pertains to a process for the preparation of aromatic polyamides via the palladium catalyzed carbonylation and condensation of aromatic primary amines and aromatic trifluoromethane sulfonates.

Aromatic polyamides are commonly prepared by the condensation of aryl diacid chlorides and aromatic diamines in a dipolar aprotic solvent. This method has the shortcomings of requiring low temperatures in order to achieve high molecular weight polymers and being subject to the limited variety of available aromatic diacid chlorides and the hydrolytically unstable nature of diacid chlorides.

Japanese Kokai 123823, published May 16, 1989, and Yoneyama et al, *Macromolecules,* Vol. 21, 1988, pp. 1908-1911 disclose the use of a Heck carbonylation reaction, to produce low molecular weight polyamides, by the reaction of aromatic dibromides and diamines, in the presence of carbon monoxide and a palladium catalyst. U.S. Pat. No. 5,104,971, issued Apr. 14, 1992, to Perry et al, discloses use of a Heck carbonylation reaction to produce high molecular weight polyamides, by the reaction, under pressure, of aromatic diiodides and diamines, in the presence of carbon monoxide and a palladium catalyst. The use of Heck carbonylation reactions to produce polyamides avoids the problems presented by acid chlorides, but requires appropriately substituted halides and the removal or recycling of halide generated during the coupling reaction. It is therefore highly desirable to provide an improved method for the preparation of aromatic polyamides.

Amide formation from aryl and vinyl trifluoromethane sulfonates is reported in Ortar, et al, *Tetrahedron Letters,* Vol. 26, (1985) pp. 1109-1112 and Ortar, et al, *Tetrahedron Letters,* Vol. 27, (1986) pp. 3931-3934.

SUMMARY OF THE INVENTION

It is an object of the invention to provide an improved method for the preparation of aromatic polyamides. In the broader aspects of the invention, there is provided a method for preparing polyamide comprising reacting carbon monoxide and the reactant pair

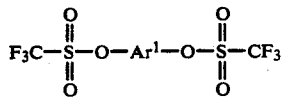

and $H_2N-Ar^2-NH_2$, wherein $-Ar^1-$ and $-Ar^2-$ are each independently selected from the group consisting of aromatic and heteroaromatic moieties having a total of ring carbons and heteroatoms of from 6 to about 30, in the presence of solvent and a catalyst. The catalyst is a compound of a metal selected from the group consisting of platinum, palladium and nickel.

DESCRIPTION OF A SPECIFIC EMBODIMENT

Aromatic polyamides, which are also known as aramids, are very widely used as fibers and engineering plastics, in composites and laminates and as films.

In the method of the invention, aromatic polyamides are prepared by the metal-mediated carbonylation and coupling of a reactant having the general formula:

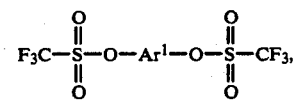

referred to herein as "trifluoromethane sulfonate reactant", and a reactant having the general formula: $H_2N-Ar^2-NH_2$, referred to herein as "aromatic amino reactant". The method of the invention is the reaction of an AA monomer with a BB monomer to produce an AABBAABB polymer.

In the above formulas, the $Ar^1$ and $Ar^2$ are each an independently selected aromatic or heteroaromatic moiety having from 1 to 5, five or six membered rings. The rings are solitary or linked or fused. The trifluoromethane sulfonate groups and amino groups of the reactant or reactants are substituents of an $Ar^1$ or $Ar^2$ moiety, which can have additional substituents. Those trifluoromethane sulfonate and amino groups of $Ar^1$ and $Ar^2$ can be bonded to the same or different aromatic rings in the moiety and are each non-ortho to other ring substituents. The additional substituents are unreactive, that is, they do not have a deleterious effect, for example, steric hindrance or electronic deactivation of the polymerization reaction. $Ar^1$ and $Ar^2$ could bear substituents which would introduce branching, for example, additional trifluoromethane sulfonate groups or additional amino groups, however, branching can affect the rheological and physical properties of the polymer. It is preferred that the total of amino and trifluoromethane sulfonate groups on a reactant be two.

Linked rings can be joined by a direct link or a linking group selected from the group consisting of arylene, heteroarylene, fused arylene, alkyl or haloalkyl groups of from 1 to 10 carbons, $-O-$, $-S-$,

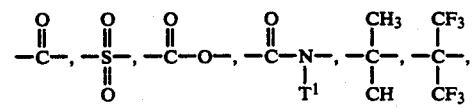

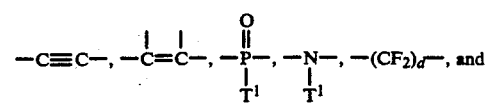

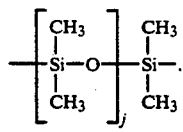

Each $T^1$ is independently selected from the group consisting of alkyl, aryl and heteroaryl; d is an integer from 1 to about 12; and j is an integer between 0 and 300. Suitable $Ar^1$ and $Ar^2$ groups include phenyl, naphthyl, anthracyl, phenanthryl, biphenyl, phenylether, diphenylsulfone, diphenylketone, diphenylsulfide, pyridine, quinoline.

Examples of specific aromatic trifluoromethane sulfonate reactants suitable for the method of this invention include: phenyl-1,3,5-tris(trifluoromethane sulfonate), naphthyl-2,4,7-tris(trifluoromethane sulfonate), biphenyl-3,3',5-tris(trifluoromethane sulfonate), 3,3',5-tris(trifluoromethane sulfonate) diphenylether, 2,4,4'-tris(trifluoromethane sulfonate) diphenylether, 3,3',5-tris(trifluoromethane sulfonate) diphenylsulfone. More desirable, however, are aromatic bis(trifluoromethane sulfonate)s such as: 2,2-bis(4-trifluoromethanesulfanatophenyl)propane, 4,4'-bis(trifluoromethanesulfanato)-biphenyl, phenyl-1,3-bis(trifluoromethane sulfonate), phenyl-1,4-bis(trifluoromethane sulfonate), 4,4'-bis(trifluoromethane sulfonato)diphenylsulfone, 4,4'-bis(trifluoromethanesulfonato)diphenylether, 3,4'-bis(trifluoromethanesulfonato)diphenylether, 4,4'-bis(trifluoromethanesulfonato)benzophenone, 5-trifluoromethanesulfonato-3-(4-trifluoromethanesulfonatophenyl)-1,1,3-trimethylindane, and 2,2-bis(4-trifluoromethanesulfonatophenyl)hexafluoropropane.

Examples of aromatic amine reactants suitable for the method of the invention include: 1,4 diaminobenzene; 1,3 diaminobenzene; 4,4'-diaminobenzophenone; 4,4'-diaminodiphenyl-methane; 2,2-bis(4-aminophenyl)propane; 9,9-bis(4-aminophenyl)fluorene; 4,4'-diaminodiphenylether; 1,4[2-(4-aminophenyl)-2-propyl]benzene; 5-amino-3-(4-aminophenyl)-1,1,3-trimethylindane; 2,2'-bis(trifluoromethyl)-4,4'-diaminobiphenyl; 3,4'-diaminodiphenylether; 4,4'-bis(4-aminophenoxy)biphenyl 2,2-bis[4-(4-aminophenoxy)-phenyl]propane; 1,4-bis(4-aminophenoxy)benzene; 3,3'-diamino-diphenylsulfone; 4,4'-diamino-diphenylsulfone; 2,2'-bis[4-(4-aminophenoxy)-phenyl]sulfone; 3,5-diamino-t-butylbenzene; 2,2-bis[4-(3-aminophenoxy)-phenyl]sulfone; a,w,3-aminopropyl terminated polydimethylsiloxane oligomers having the general structure

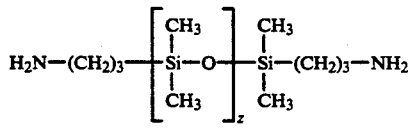

in which z is an integer from 1 to about 50, and a,w-diaminoalkanes having the general structure $H_2N-(CH_2)_y-NH_2$, in which y is from 1 to 10.

Although reactants are discussed herein as individual compounds, the method of this application is not limited to reactions utilizing individual compounds as reactants, but is also inclusive of reactions utilizing mixtures of compounds as reactants. The method of the invention is not limited to any particular aromatic trifluoromethane sulfonate or combination of aromatic trifluoromethane sulfonates, nor to any particular aromatic amine or combination of aromatic amines, however it is necessary that selected reactants react under the reaction conditions employed to form the aromatic polyamide. It is desirable that the reactants be sufficiently stable under the reaction conditions employed and that the reactants not be subject to an unacceptable amount of undesirable side reactions, to prevent the formation of an unacceptable amount of by-product. It is also desirable that the reactants be free of groups which unduly retard the reaction by steric hindrance or by lowering the activity of the catalyst.

The reactants are contacted with carbon monoxide. It is convenient to add an excess of carbon monoxide to the reaction zone. The excess of carbon monoxide need not be measured; one can merely pressurize the vessel with carbon monoxide to the desired reaction pressure. Carbon monoxide can be at, or below atmospheric pressure or at a higher pressure.

In the disclosed embodiments of the invention, the reaction step is conducted in the presence of an organic solvent, which appreciably dissolves reactants to provide a liquid reaction medium, which facilitates the contacting of the reactants and the catalyst. It is desirable that the solvent be "inert" to the reaction, i.e., that the solvent not enter into the reaction in an undesired way. The invention is not limited to a particular solvent or solvent system and a wide variety of organic compounds can be used. In a particular embodiment of the invention, exemplary solvents are hydrocarbon solvents, such as toluene and ether solvents, for example: tetrahydrofuran, diglyme (2-methoxyethyl ether), and glyme (1,2-dimethoxyethane). In another embodiment of the invention, a desirable solvent is dipolar and aprotic, that is, the solvent has a highly polar molecule with hydrogens that are not easily abstractable. Exemplary dipolar aprotic solvents include dimethylformamide; dimethylacetamide; dimethylsulfoxide; 1,3-dimethyl-2-imidazolidinone; hexamethylphosphoramide; N-methylpyrrolidinone; N-cyclohexylpyrrolidinone; and dimethylimidazolidinone.

The amount of solvent present is not critical to the reaction, however, it is desirable to use enough solvent to facilitate the reaction. Specific polymers may have optimum concentrations in various solvents. There is no theoretical upper limit on the amount of solvent employed, however, practical limits are imposed by the size of the reaction vessel, the ease of separation of product from the reaction medium, cost and other factors. It is ordinarily desirable that the amount of solvent used be within the range of from about 0.1 and about 1000 parts by weight based on the volume of aromatic trifluoromethane sulfonate used. It is also ordinarily desirable that the reaction medium be agitated, for example, by stirring, to facilitate mixing of gaseous carbon monoxide.

The process of the invention is carried out in the presence of a catalyst. The catalyst is a transition metal catalyst in which platinum, nickel or palladium is present in the zero valent or divalent state. Palladium is preferred. The catalysts have one or more ligands bonded to one or more transition metal atoms by ionic or covalent bonds. Representative palladium catalysts include simple palladium salts such as $PdX_2$, in which X is Cl, Br or I and the other palladium catalysts listed in Table 1.

TABLE 1
Palladium catalysts

| Pd+2 | |
|---|---|
| PdX$_2$L$_2$ | X = Cl, Br, I<br>L = R$_3$P, where R = alkyl or aryl |
| Pd(OAc)$_2$ | OAc = acetate |
| Pd(OAc)$_2$L$_2$ | OAc = acetate |
| PdCl$_2$(RCN)$_2$ | R = CH$_3$, Phenyl |
| PhPdXL$_2$ | X = Br, I |
| PdCl$_2$(COD)$_2$ | COD = cis, cis-1,5-cyclooctadiene |
| Pd(acac)$_2$ | acac = 2,4-pentanedionate |
| PdCl$_2$DPPF | DPPF = 1,1'-bis(diphenylphosphino)ferrocene |
| PdCl$_2$DPPE | DPPE = 1,2-bis(diphenylphosphino)ethane |
| PdCl$_2$DPPP | DPPP = 1,3-bis(diphenylphosphino)propane |
| PdCl$_2$DPPB | DPPB = 1,4-bis(diphenylphosphino)butane |
| Pd(0) | |
| PdL$_4$ | L = R$_3$P, where R = alkyl or aryl |

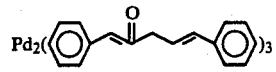

| | |
|---|---|
| Pd(DPPE)$_2$ | DPPE = 1,2-bis(diphenylphosphino)ethane |
| Pd(DPPP)$_2$ | DPPP = 1,3-bis(diphenylphosphino)propane |
| Pd(DPPB)$_2$ | DPPB = 1,4-bis(diphenylphosphino)butane |

A catalytic amount of catalyst is employed. By "catalytic amount" is meant an amount of catalyst which catalyzes the reaction to the desired extent. Generally, the amount of catalyst is at least about 0.01 mole percent based on the amount of aromatic trifluoromethane sulfonate. There is no real upper or lower limit on the amount of catalyst, this being defined by secondary considerations such as cost and ease of separation of the catalyst from products and unreacted reactants. A preferred catalytic amount is from about 0.005 to about 0.20 moles per mole of aromatic trifluoromethane sulfonate reactant. The catalyst can be bound to a support or unsupported.

The reaction can take place in the presence of an activating ligand, such as phosphine or arsine ligand. Such a ligand can be used with a catalyst, for example, triphenylphosphine with bis(triphenylphosphine) palladium(II) chloride to increase the rate of the catalyzed reaction. The amount of ligand used is desirably between about 0.01 mole and about 5.0 moles per mole of metal catalyst, and more desirably at about 2 moles per mole of metal catalyst. It is believed that the presence of the activating ligand speeds up the oxidative addition of such catalysts to the aromatic trifluoromethane sulfonate reactant by making the catalyst more nucleophilic.

The process of this invention preferably includes the neutralization of by-product trifluoromethane sulfonic acid, for example, by conducting the reaction in the presence of base. The base can be a tertiary amine such as tribuylamine, pyridine, 1,8-diazobicyclo[5,4,0]-7-undecene (DBU), 1,5-diazobicyclo[4,3,0]non-5-ene (DBN) or have the formula:

NR$_3$ wherein each R is independently selected from lower alkyl groups having from about 2 to about 6 carbon atoms. The base can be immobilized on a cross-linked polymer such as cross-linked poly(vinylpyridine) beads. Alternatively, the base can be another type of basic substance which does not react with the reactants, e.g., a metal carbonate such as K$_2$CO$_3$ or a metal hydroxide such as Ca(OH)$_2$ or a metal acetate such as sodium acetate. Generally, one employs at least enough base to react with the by-product trifluoromethane sulfonic acid produced. An excess can be used, if desired. As with the reactants, solvents and catalysts, a skilled practitioner will recognize that the exact structure of the base is not critical, and the examples of compounds set forth above are merely illustrative and not-limiting examples of materials that can be used in this invention. A skilled practitioner will recognize that other means can be substituted in this invention to achieve similar results.

The process of this invention is preferably conducted at a temperature within the range of from about room temperature, i.e., about 20° C., to about 250° C. A desirable temperature range is from about 70° C. to about 150° C. A skilled practitioner will recognize that the reaction temperature is not critical, and that temperatures outside this range can be employed, if desired. Generally, one selected a reaction temperature which affords a reasonable rate of reaction and which does not give an undue amount of decomposition of products or reactants.

The reaction time is not a truly independent variable but is dependent at least to some extent on the other reaction parameters selected such as the reactivity of the reactants, activity and amount of catalyst, reaction temperature, pressure and so forth. Generally, reaction times within the range of from about 0.1 to about 100 hours are used.

The aromatic polyamides produced by the method of the invention do not require the addition of salt to the reaction mixture. Salt can be added to the reaction medium in the methods of the invention. The salt may impart solubility to some polymers, presumably by breaking up hydrogen bonding on the polymer chains. It is desirable to keep the polyamide in solution from the standpoint of process efficiency. Suitable salts include salts of lithium such as LiCl, LiBr, and CaCl$_2$.

The method of the invention is not limited by a particular theory or explanation, however, a theoretical explanation can be provided. It is believed that the method of the invention includes the following reaction mechanism sequence, in which the polymer formation step further comprises an oxidative addition step, a carbon monoxide insertion step and a coupling step. In that reaction sequence, a palladium(O) catalyst, which can be introduced as a palladium(O) complex or as a palladium(II) species which is subsequently reduced in situ, undergoes oxidative addition to a trifluoromethane sulfonate compound generating an aryl palladium(II) trifluoromethane sulfonate intermediate. The ligands on palladium can be CO, phosphines or amines. Since the palladium catalyst is present in small quantities relative to the trifluoromethane sulfonate compound, it is unlikely that bis(aryl palladium(II) trifluoromethane sulfonate) intermediates are formed to any great degree, but the oxidative addition reaction takes place at both trifluoromethane sulfonate groups of di(trifluoromethane sulfonate) compounds at some point during the reaction. Then CO insertion generates an acyl palladium(II) trifluoromethane sulfonate complex. This electrophilic acyl palladium complex is then attacked by the aromatic amino compound in the coupling reaction. The trifluoromethane sulfonic acid which is liberated is neutralized by the added base (DBU) and the palladium(O) catalyst is regenerated. This mechanism sequence is illustrated below for the reaction of 4,4'-isopropylidenediphenol di(trifluoromethane sulfonate) and 4,4'-diaminodiphenyl ether.

average molecular weight determinations (also referred to herein as $M_w$ and $M_n$, respectively).

EXAMPLE 2

The same procedures were followed and results are presented as in Example 2, with the exceptions that reactants differed, as indicated in Table 2, and the polymer precipitated in the reaction mixture and was sepa-

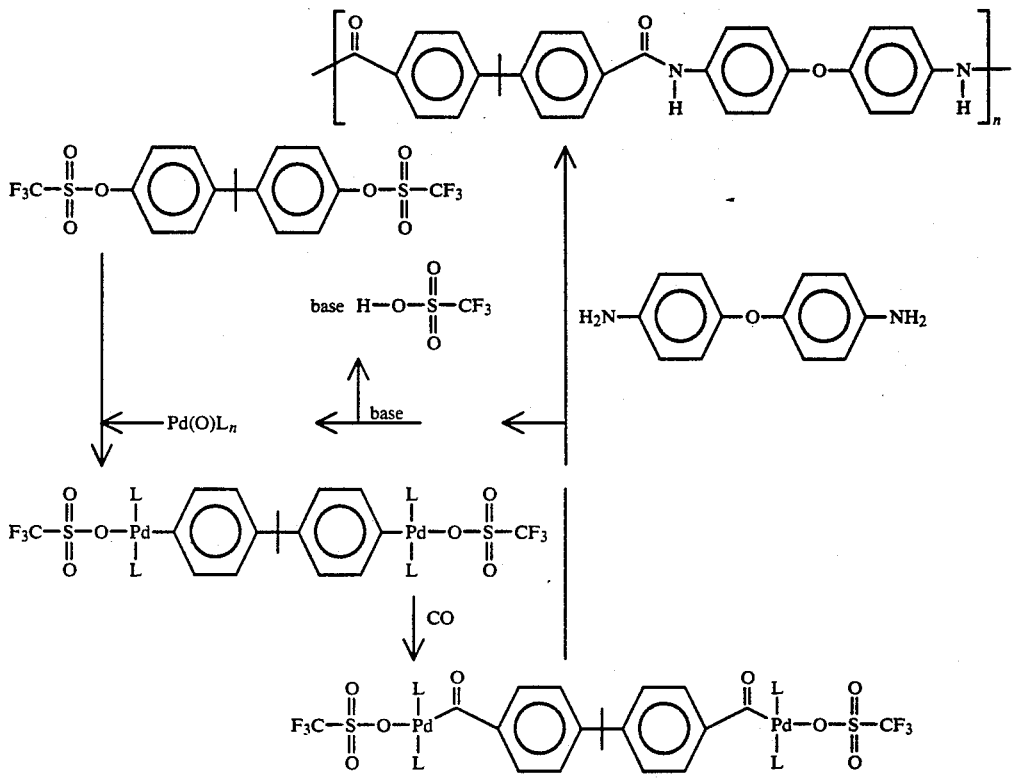

The following examples are presented for a further understanding of the invention:

EXAMPLE 1

The reaction was performed in a dry 3-necked round bottom flask equipped with a stir bar and fitted with a gas inlet and a reflux condenser. The vessel was charged with the aromatic amine reactant, aromatic trifluoromethane sulfonate reactant, catalyst, ligand and solvent. Specific compounds and additional information relating to this example appears in Table 2. The reaction mixture was degassed, placed under one atmosphere of carbon monoxide and heated to 115° C. After stirring for one minute the base was added. The reactions were allowed to proceed for the reaction times indicated in Table 2. The reaction mixture was then filtered through a medium frit sintered glass funnel, the filtrate was precipitated into and washed with methanol and dried in vacuo, to isolate a solid polymer. The inherent viscosity of the polymer was determined by analyzing a 0.25 weight/weight percent solution of the polymer at 25° C. with a Schott Gerate 526-10 viscometer. Infrared spectra were recorded on a Nicolet 5ZDX spectrometer as KBr pellets. Size exclusion chromatography data was obtained from a Waters HPLC using μ-styragel columns of $10^6$, $10^5$, $10^4$, $10^3$ Angstroms calibrated against poly(methylmethacrylate) standards in dimethylformamide to obtain weight average and number rated by filtration, followed by extensive washing with methanol and drying in vacuo.

EXAMPLE 3

The same procedures were followed and results are presented as in Example 2, with the exceptions that reactants differed, as indicated in Table 2, and the filtrate was precipitated into and washed with water, dried in vacuo, redissolved in N,N'-dimethylacetamide and reprecipitated into water and dried in vacuo.

EXAMPLE 4

A Fischer-Porter bottle equipped with a Teflon coated stir-bar, a pressure guage, a pressure release valve, a gas inlet and a straight ball valve for degassing and sample withdrawl was charged with aromatic trifluoromethanesulfonate reactant, aromatic diamine reactant, catalyst, ligand and solvent as listed in Table 2. The reaction mixture was degassed and placed under 1 kg/cm² of carbon monoxide. After stirring for 1 minute at 115° C., 1,8-diazabicyclo[5.4.0]undec-7-ene (1.08 mL., 7.2 mmol) was added and the reaction vessel was pressurized to 7.7 kg/cm² with carbon monoxide. The reaction was allowed to continue for 6 hours after which time very fine precipitate was collected by filtration, washed with methanol, then dried in vacuo (115° C. and 0.1 torr) to give 1.16 grams of polymer at a yield of 95%. The polymer was analyzed, providing the data listed in Table 2, by the procedures described in Example 1. Results are presented in Table 2.

EXAMPLE 5

The same procedures were followed and results are presented as in Example 4, with the exceptions that reactants differed, as indicated in Table 2; the polymer produced was redissolved in dimethylacetamide, filtered, concetrated, reprecipitated into methanol and dried in vacuo to give 1.397 grams of polymer at a yield of 104%; and inherent viscosity was determined for the polymer, after drying, by the procedure described in Example 1.

EXAMPLE 6

The same procedures were followed and results are presented as in Example 4, with the exceptions that reactants differed, as indicated in Table 2; the reaction was allowed to continue for 22 hours after which time precipitate was collected by filtration, precipitated with water, washed with water, washed with a 2 to 1, volume/volume mixture of water and methanol and then dried in vacuo (60° C. and 0.1 torr) to give 2.17 grams of polymer at a yield of 98%.

EXAMPLE 7

The same procedures were followed and results are presented as in Example 4, with the exceptions that reactants differed, as indicated in Table 2; the reaction was allowed to continue for 23 hours after which time precipitate was collected by filtration, precipitated with methanol, washed with methanol, and then dried in vacuo at 80°–90° C.

EXAMPLE 8

The same procedures were followed and results are presented as in Example 7, with the exceptions that the reactants differed as indicated in Table 2.

EXAMPLE 9

The same procedures were followed and results are presented as in Example 7, with the exceptions that the reactants differed as indicated in Table 2.

TABLE 2

| EXAMPLE | 1 | 2 | 3 | 4 | 5 |
|---|---|---|---|---|---|
| Aromatic trifluoromethane sulfonate concentration (millimolar) | | | | | |
| 2,2-bis(4-trifluoromethane sulfonatophenyl)propane | 5.15 | — | — | — | 3.00 |
| 4,4'-bis(trifluoromethane sulfonato)biphenyl | — | 5.20 | — | 3.00 | — |
| phenyl-1,3-trifluoromethane sulfonate | — | — | 8.47 | — | — |
| Aromatic amine concentration (millimolar) | | | | | |
| 4,4'-diaminodiphenylether | 5.15 | 5.20 | 8.47 | 3.00 | 3.00 |
| 2,2-bis[4-(4-aminophenoxy)phenyl]propane | — | — | — | — | — |
| 2,2-bis[4-(3-aminophenoxy)phenyl]sulfone | — | — | — | — | — |
| Solvent volume (in milliliters) | | | | | |
| Dimethylacetamide | 15.6 | 15.8 | 25.7 | 9.0 | 9.0 |
| Catalyst concentration (millimolar) | | | | | |
| tetra-kis(triphenylphosphine)palladium(0) | — | — | — | — | — |
| (1,2-bis(diphenylphosphino)ethane palladium(II)chloride | 0.309 | 0.312 | 0.508 | — | — |
| Pd(II)chloride | — | — | — | — | — |
| Pd(II)acetate | — | — | — | 0.09 | 0.09 |
| Ligand concentration (millimolar) | | | | | |
| 1,2-bis(diphenylphosphino)ethane | 0.309 | 0.625 | 0.508 | — | — |
| 1,1'-bis(diphenylphosphino)ferrocene | — | — | — | — | — |
| 1,4-bis(diphenylphosphino)butane | — | — | — | 0.18 | 0.18 |
| Base concentration (millimolar) | | | | | |
| 1,8-diazabicyclo[5.4.0]undec-7-ene | 12.36 | 12.36 | 20.33 | 7.20 | 7.20 |
| Salt concentration (millimolar) | | | | | |
| Lithium chloride | — | — | — | — | — |
| Temperature (°C.) | 115° | 115° | 115° | 115° | 115° |
| CO pressure (kg/cm$^2$) | 1.0 | 1.0 | 1.0 | 7.7 | 7.7 |
| Reaction time (in hours) | 3.5 | 5.0 | 18.0 | 6.0 | 6.0 |
| $\eta$inh | 0.17 | 0.14 | 0.23 | — | .26 |
| Tg (°C.) | 218 | — | 103 | — | 229 |
| $M_w$ | 16,000 | — | 57,400 | — | 23,400 |
| $M_n$ | 10,100 | — | 27,900 | — | 13,900 |
| Infrared absorption peaks (in cm$^{-1}$) | | | | | |
| | 3310 | 3421 | 3369 | 3316 | 3308 |
| | 2968 | 1645 | 1652 | 1645 | 2967 |
| | 1653 | 1606 | 1602 | 1607 | 1651 |
| | 1607 | 1498 | 1498 | 1499 | 1606 |
| | 1499 | 1406 | 1408 | 1407 | 1498 |
| | 1408 | 1218 | 1220 | 1220 | 1408 |
| | 1218 | 843 | 831 | 832 | 1216 |
| | 831 | | | | 830 |

| EXAMPLE | 6 | 7 | 8 | 9 |
|---|---|---|---|---|
| Aromatic trifluoromethane sulfonate concentration (millimolar) | | | | |
| 2,2-bis(4-trifluoromethane sulfonatophenyl)propane | — | — | 3.00 | 3.00 |
| 4,4'-bis(trifluoromethane sulfonate)biphenyl | — | — | — | — |
| phenyl-1,3-trifluoromethane sulfonate | 6.68 | 3.00 | — | — |
| Aromatic amine concentration (millimolar) | | | | |
| 4,4'-diaminodiphenyl ether | 6.68 | — | — | — |
| 2,2-bis[4-(4-aminophenoxy)phenyl]propane | — | 3.00 | — | 3.00 |
| 2,2-bis[4-(3-aminophenoxy)phenyl]sulfone | — | — | 3.00 | — |
| Solvent volume (in milliliters) | | | | |
| Dimethylacetamide | 20.2 | 18.0 | 18.0 | 12.0 |
| Catalyst concentration (millimolar) | | | | |
| tetra-kis(triphenylphosphine)palladium(0) | — | — | — | 0.09 |
| (1,2-bis(diphenylphosphino)ethane | 0.401 | — | — | — |

TABLE 2-continued

| palladium(II)chloride | | | | |
|---|---|---|---|---|
| Pd(II)chloride | — | 0.09 | 0.09 | — |
| Pd(II)acetate | — | — | — | — |
| Ligand concentration (millimolar) | | | | |
| (1,2-bis(diphenyl-phosphino)ethane | 0.401 | — | — | — |
| 1,1'-bis(diphenyl-phosphino)ferrocene | — | 0.09 | 0.09 | — |
| 1,4-bis(diphenyl-phosphino)butane | — | — | — | — |
| Base concentration (millimolar) | | | | |
| 1,8-diazabicyclo [5.4.0] undec-7-ene | 16.04 | 7.20 | 7.20 | 7.20 |
| Salt concentration (millimolar) | | | | |
| Lithium chloride | — | — | — | 9.3 |
| Temperature (°C.) | 115° | 115° | 115° | 115° |
| CO pressure (kg/cm²) | 7.7 | 7.7 | 7.7 | 7.7 |
| Reaction time (in hours) | 22 | 23 | 23 | 23 |
| ηinh | — | — | — | — |
| Tg (°C.) | 95 | 157 | 189 | 149 |
| $M_w$ | 3,000 | 4,900 | 10,400 | 5,400 |
| $M_n$ | 2,700 | 4,200 | 7,100 | 4,600 |
| Infrared absorption peaks (in cm$^{-1}$) | | | | |
| | 3362 | 3378 | 3375 | 3364 |
| | 1647 | 1669 | 1673 | 1654 |
| | 1604 | 1605 | 1601 | 1606 |
| | 1498 | 1499 | 1585 | 1499 |
| | 1408 | 1231 | 1533 | 1408 |
| | 1222 | 1171 | 1486 | 1225 |
| | 832 | 1013 | 1434 | 831 |
| | | 831 | 1264 | |
| | | | 1233 | |
| | | | 1150 | |
| | | | 1105 | |

Table 3 shows the structural formulas for the reactants of each example and the repeating unit structural formulas of polymers produced by the method of the invention and supported by the data presented in Table 2.

TABLE 3

Structural formulas for Examples 1–6

EXAMPLES 1 and 5   Aromatic di(trifluoromethane sulfonate)

[structure: F₃C—S(=O)₂—O—(phenyl)—(phenyl)—O—S(=O)₂—CF₃]

Aromatic amine

[structure: H₂N—(phenyl)—O—(phenyl)—NH₂]

Polymer

[structure: polymer repeating unit with two benzoyl groups linked to diphenyl ether diamine]

2 and 4   Aromatic di(trifluoromethane sulfonate)

[structure: F₃C—S(=O)₂—O—(phenyl)—(phenyl)—O—S(=O)₂—CF₃]

Aromtic amine

[structure: H₂N—(phenyl)—O—(phenyl)—NH₂]

TABLE 3-continued

Structural formulas for Examples 1–6

Polymer

[structure: polymer repeating unit]

3 and 6   Aromatic di(trifluoromethane sulfonate)

[structure: R₃C—S(=O)₂—(phenyl)—S(=O)₂—CF₃]

Aromatic amine

[structure: H₂N—(phenyl)—O—(phenyl)—NH₂]

Polymer

[structure: polymer repeating unit]

The method of the invention provides the advantage of producing polyamides and not utilizing the condensation of aromatic diamines and aromatic diacids and avoiding the use of diacid chlorides and the use of dihalides.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A method for preparing polyamide comprising reacting carbon monoxide and the reactant pair

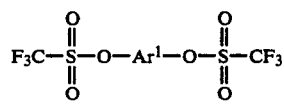

and H₂N—Ar²—NH₂, wherein —Ar¹— and —Ar²— are each independently selected from the group consisting of aromatic and heteroaromatic moieties having a total of ring carbons and heteroatoms of from 6 to about 30, in the presence of solvent and catalyst, said catalyst being selected from the group consisting of platinum compounds, palladium compounds, and nickel compounds.

2. The method of claim 1 wherein each said trifluoromethane sulfonate group is non-ortho.

3. The method of claim 1 further comprising neutralizing trifluoromethane sulfonic acid.

4. The method of claim 1 wherein said catalyst is a palladium compound.

5. The method of claim 1 wherein —Ar¹— and —Ar²— are each independently selected from the group consisting of arylene and heteroarylene groups having five or six membered rings, fused systems of said rings, directly linked systems of said rings, or linked systems of said rings having bridge members selected from the group consisting of alkyl having about 1 to about 10 carbons, haloalkyl having about 1 to about 10 carbons, —O—, —S—,

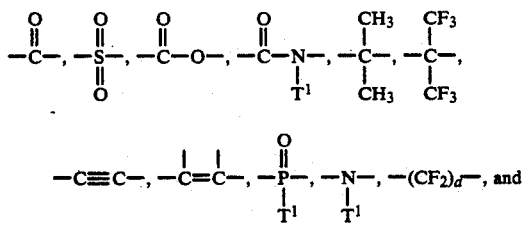

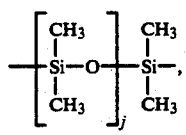

wherein each $T^1$ is independently selected from the group consisting of alkyl, aryl and heteroaryl, d is an integer from 1 to about 12, and j is an integer between 0 and 300.

6. The method of claim 1 wherein —$Ar^1$— and —$Ar^2$— are each selected from the group consisting of phenyl, naphthyl, anthracyl, phenanthryl, biphenyl, phenylether, diphenylsulfone, diphenylketone, diphenylsulfide, pyridine, and quinoline.

7. The method of claim 1 comprising reacting at a carbon monoxide pressure greater than about 1 kilogram per square centimeter.

8. The method of claim 1 wherein said aromatic trifluoromethane sulfonate reactant is selected from the group consisting of: phenyl-1,3,5-tris(trifluoromethane sulfonate); naphthyl-2,4,7-tris(trifluoromethane sulfonate); biphenyl-3,3′,5-tris(trifluoromethane sulfonate); 3,3′,5-tris(trifluoromethane sulfonate) diphenylether; 2,4,4′-tris(trifluoromethane sulfonate)diphenylether; 3,3′,5-tris(trifluoromethane sulfonate)diphenylsulfone; 2,2-bis(4-trifluoromethanesulfanatophenyl)propane; 4,4′-bis(trifluoromethanesulfanato)biphenyl; phenyl-1,3-bis(trifluoromethane sulfonate); phenyl-1,4-bis(trifluoromethane sulfonate); 4,4′-bis(trifluoromethane sulfonato)diphenylsulfone; 4,4′-bis(trifluoromethanesulfonato)diphenylether; 3,4′-bis(trifluoromethanesulfonato)diphenylether; 4,4′-bis(trifluoromethanesulfonato)benzophenone; 5-trifluoromethanesulfonato-3-(4-trifluoromethanesulfonatophenyl)-1,1,3-trimethylindane; 2,2-bis(4-trifluoromethanesulfonatophenyl)hexafluoropropane.

9. The method of claim 1 wherein said aromatic amine reactant is selected from the group consisting of : 1,4 diaminobenzene; 1,3 diaminobenzene; 4,4′-diaminobenzophenone; 4,4′-diaminodiphenyl-methane; 2,2-bis(4-aminophenyl)propane; 9,9-bis(4-aminophenyl)fluorene; 4,4′-diaminodiphenylether; 1,4[2-(4-aminophenyl)-2-propyl]benzene; 5-amino-3-(4-aminophenyl)-1,1,3-trimethylindane; 2,2′-bis(trifluoro-methyl)-4,4′-diaminobiphenyl; 3,4′-diaminodiphenylether; 4,4′-bis(4-aminophenoxy)biphenyl; 2,2-bis[4-(4-aminophenoxy)-phenyl]propane; 1,4-bis(4-aminophenoxy)benzene; 3,3′-diamino-diphenylsulfone; 4,4′-diamino-diphenylsulfone; 2,2′-bis[4-(4-aminophenoxy)-phenyl]sulfone; 3,5-diamino-t-butylbenzene; 2,2-bis[4-(3-aminophenoxy)-phenyl]sulfone;

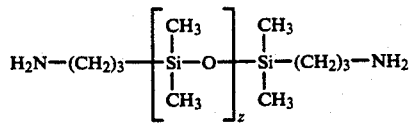

wherein z is an integer from 1 to about 50; $H_2N$—($CH_2$)$_y$—$NH_2$, wherein y is an integer from 1 to 10.

10. The method of claim 1 wherein said aromatic trifluoromethane sulfonate reactant is selected from the group consisting of: phenyl-1,3,5-tris(trifluoromethane sulfonate); naphthyl-2,4,7-tris(trifluoromethane sulfonate); biphenyl-3,3′,5-tris(trifluoromethane sulfonate); 3,3′,5-tris(trifluoromethane sulfonate) diphenylether; 2,4,4′-tris(trifluoromethane sulfonate)diphenylether; 3,3′,5-tris(trifluoromethane sulfonate)diphenylsulfone; 2,2-bis(4-trifluoromethanesulfanatophenyl)propane; 4,4′-bis(trifluoromethanesulfanato)biphenyl; phenyl-1,3-bis(trifluoromethane sulfonate); phenyl-1,4-bis(trifluoromethane sulfonate); 4,4′-bis(trifluoromethane sulfonato)diphenylsulfone; 4,4′-bis(trifluoromethanesulfonato)diphenylether; 3,4′-bis(trifluoromethanesulfonato)diphenylether; 4,4′-bis(trifluoromethanesulfonato)benzophenone; 5-trifluoromethanesulfonato-3-(4-trifluoromethanesulfonatophenyl)-1,1,3-trimethylindane; and 2,2-bis(4-trifluoromethanesulfonatophenyl)hexafluoropropane:

and said aromatic amine reactant is selected from the group consisting of : 1,4 diaminobenzene; 1,3 diaminobenzene; 4,4′-diaminobenzophenone; 4,4′-diaminodiphenyl-methane; 2,2-bis(4-aminophenyl)propane; 9,9-bis(4-aminophenyl)fluorene; 4,4′-diaminodiphenylether; 1,4[2-(4-aminophenyl)-2-propyl]benzene; 5-amino-3-(4-aminophenyl)-1,1,3-trimethylindane; 2,2′-bis(trifluoro-methyl)-4,4′-diaminobiphenyl; 3,4′-diaminodiphenylether; 4,4′-bis(4-aminophenoxy)biphenyl; 2,2-bis[4-(4-aminophenoxy)-phenyl]propane; 1,4-bis(4-aminophenoxy)benzene; 3,3′-diamino-diphenylsulfone; 4,4′-diamino-diphenylsulfone; 2,2′-bis[4-(4-aminophenoxy)-phenyl]sulfone; 3,5-diamino-t-butylbenzene; 2,2-bis[4-(3-aminophenoxy)-phenyl]sulfone;

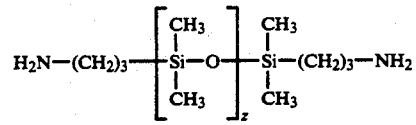

wherein z is an integer from 1 to about 50; and $H_2N$—($CH_2$)$_y$—$NH_2$, wherein y is an integer from 1 to 10.

11. The method of claim 1 wherein said catalyst is a palladium compound having a palladium atom in the zero valent or divalent state.

12. The method of claim 1 wherein said catalyst is selected from the group consisting of $PdCl_2$, $PdBr_2$, $PdI_2$, $PdCl_2(R^1{}_3P)_2$, $PdBr_2(R^1{}_3P)_2$, $PdI_2(R^1{}_3P)_2$, $Pd(R^2)_2$, $Pd(R^2)_2(R^1{}_3P)_2$, $PdCl_2(R^3CN)_2$, $PhPdBr(R^1{}_3P)_2$, $PhPdI(R^1{}_3P)_2$, $PdCl_2$(cis, cis-1,5-cyclooctadiene)$_2$, $Pd(2,4$-pentanedionate$)_2$, $PdCl_2(1,1′$-bis(diphenylphosphino)ferrocene), $PdCl_2(1,2$-bis(diphenylphosphino)ethane), $PdCl_2(1,3$-bis(diphenylphosphino)propane), $PdCl_2(1,4$-bis(diphenylphosphino)butane), $Pd(R^1{}_3P)_4$,

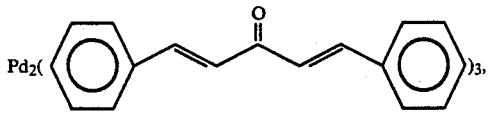

Pd(1,2-bis(diphenylphosphino)ethane)₂,
Pd(1,3-bis(diphenylphosphino)propane)₂, and
Pd(1,4-bis(diphenylphosphino)butane)₂, wherein R¹ is alkyl or aryl, R² is acetate, and R³ is CH₃ or phenyl.

13. A method for preparing polyamide comprising reacting carbon monoxide, an aromatic di(trifluoromethane sulfonate having the general formula

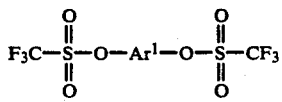

and an aromatic diamine having the general formula

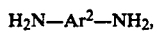

wherein —Ar¹— and —Ar²— are each independently arylene or heteroarylene, each said trifluoromethane sulfonate group is non-ortho, in the presence of solvent and a palladium catalyst having a palladium atom in the zero valent or divalent state.

14. The method of claim 13 further comprising neutralizing trifluoromethane sulfonic acid.

15. The method of claim 14 wherein said catalyst is selected from the group consisting of PdCl₂, PdBr₂, PdI₂, PdCl₂(R¹₃P)₂, PdBr₂(R¹₃P)₂, PdI₂(R¹₃P)₂, Pd(R²)₂, Pd(R²)₂(R¹₃P)₂, PdCl₂(R³CN)₂, PhPdBr(R¹₃P)₂, PhPdI(R¹₃P)₂, PdCl₂(cis, cis-1,5-cyclooctadiene)₂, Pd(2,4-pentanedionate)₂,
PdCl₂(1,1'-bis(diphenylphosphino)ferrocene),
PdCl₂(1,2-bis(diphenylphosphino)ethane),
PdCl₂(1,3-bis(diphenylphosphino)propane),
PdCl₂(1,4-bis(diphenylphosphino)butane),
Pd(R¹₃P)₄,

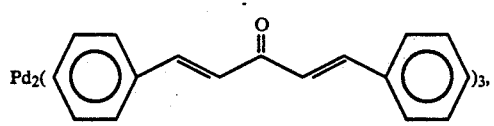

Pd(1,2-bis(diphenylphosphino)ethane)₂, Pd(1,3-bis(diphenylphosphino)propane)₂, and Pd(1,4-bis(-diphenylphosphino)butane)₂, wherein R¹ is alkyl or aryl, R² is acetate, and R³ is CH₃ or phenyl.

16. The method of claim 15 wherein —Ar¹— and —Ar²— are each independently selected from the group consisting of arylene and heteroarylene groups having five or six membered rings, fused systems of said rings, directly linked systems of said rings, or linked systems of said rings having bridge members selected from the group consisting of alkyl having about 1 to about 10 carbons, haloalkyl having about 1 to about 10 carbons, —O—, —S—,

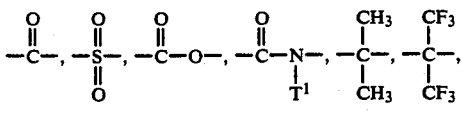

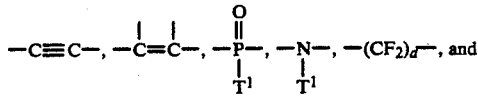

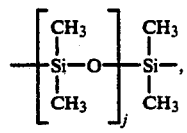

wherein each T¹ is independently selected from the group consisting of alkyl, aryl and heteroaryl, d is an integer from 1 to about 12, and j is an integer between 0 and 300.

17. The method of claim 16 comprising reacting at a carbon monoxide pressure greater than about 5 kilograms per square centimeter.

18. The method of claim 15 wherein —Ar¹— and —Ar²— are each selected from the group consisting of phenyl, naphthyl, anthracyl, phenanthryl, biphenyl, phenylether, diphenylsulfone, diphenylketone, diphenylsulfide, pyridine, and quinoline.

19. The method of claim 15 wherein said aromatic trifluoromethane sulfonate reactant is selected from the group consisting of: phenyl-1,3,5-tris(trifluoromethane sulfonate); naphthyl-2,4,7-tris(trifluoromethane sulfonate); biphenyl-3,3',5-tris(trifluoromethane sulfonate); 3,3',5-tris(trifluoromethane sulfonate) diphenylether; 2,4,4'-tris(trifluoromethane sulfonate)diphenylether; 3,3',5-tris(trifluoromethane sulfonate)diphenylsulfone; 2,2-bis(4-trifluoromethanesulfanatophenyl)propane; 4,4'-bis(trifluoromethanesulfanato)biphenyl; phenyl-1,3-bis(trifluoromethane sulfonate); phenyl-1,4-bis(trifluoromethane sulfonate); 4,4'-bis(trifluoromethane sulfonato)diphenylsulfone; 4,4'-bis(trifluoromethanesulfonato)diphenylether; 3,4'-bis(trifluoromethanesulfonato)diphenylether; 4,4'-bis(trifluoromethanesulfonato)benzophenone; 5-trifluoromethanesulfonato-3-(4-trifluoromethanesulfonatophenyl)-1,1,3-trimethylindane; 2,2-bis(4-trifluoromethanesulfonatophenyl)hexafluoropropane.

20. The method of claim 19 wherein said aromatic amine reactant is selected from the group consisting of : 1,4 diaminobenzene; 1,3 diaminobenzene; 4,4'-diaminobenzophenone; 4,4'-diaminodiphenyl-methane; 2,2-bis(4-aminophenyl)propane; 9,9-bis(4-aminophenyl)fluorene; 4,4'-diaminodiphenylether; 1,4[2-(4-aminophenyl)-2-propyl]benzene; 5-amino-3-(4-aminophenyl)-1,1,3-trimethylindane; 2,2'-bis(trifluoromethyl)-4,4'-diaminobiphenyl; 3,4'-diaminodiphenylether; 4,4'-bis(4-aminophenoxy)biphenyl; 2,2-bis[4-(4-aminophenoxy)-phenyl]propane; 1,4-bis(4-aminophenoxy)benzene; 3,3'-diamino-diphenylsulfone; 4,4'-diamino-diphenylsulfone; 2,2'-bis[4-(4-aminophenoxy)-phenyl]sulfone; 3,5-diamino-t-butylbenzene; 2,2-bis[4-(3-aminophenoxy)-phenyl]sulfone;

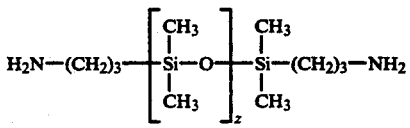

wherein z is an integer from 1 to about 50; H₂N—(CH₂)ᵧ—NH2, wherein y is an integer from 1 to 10.

* * * * *